Dec. 23, 1952  J. H. CRATE  2,622,504
COFFEE-BREWING APPARATUS
Filed June 6, 1950  2 SHEETS—SHEET 1
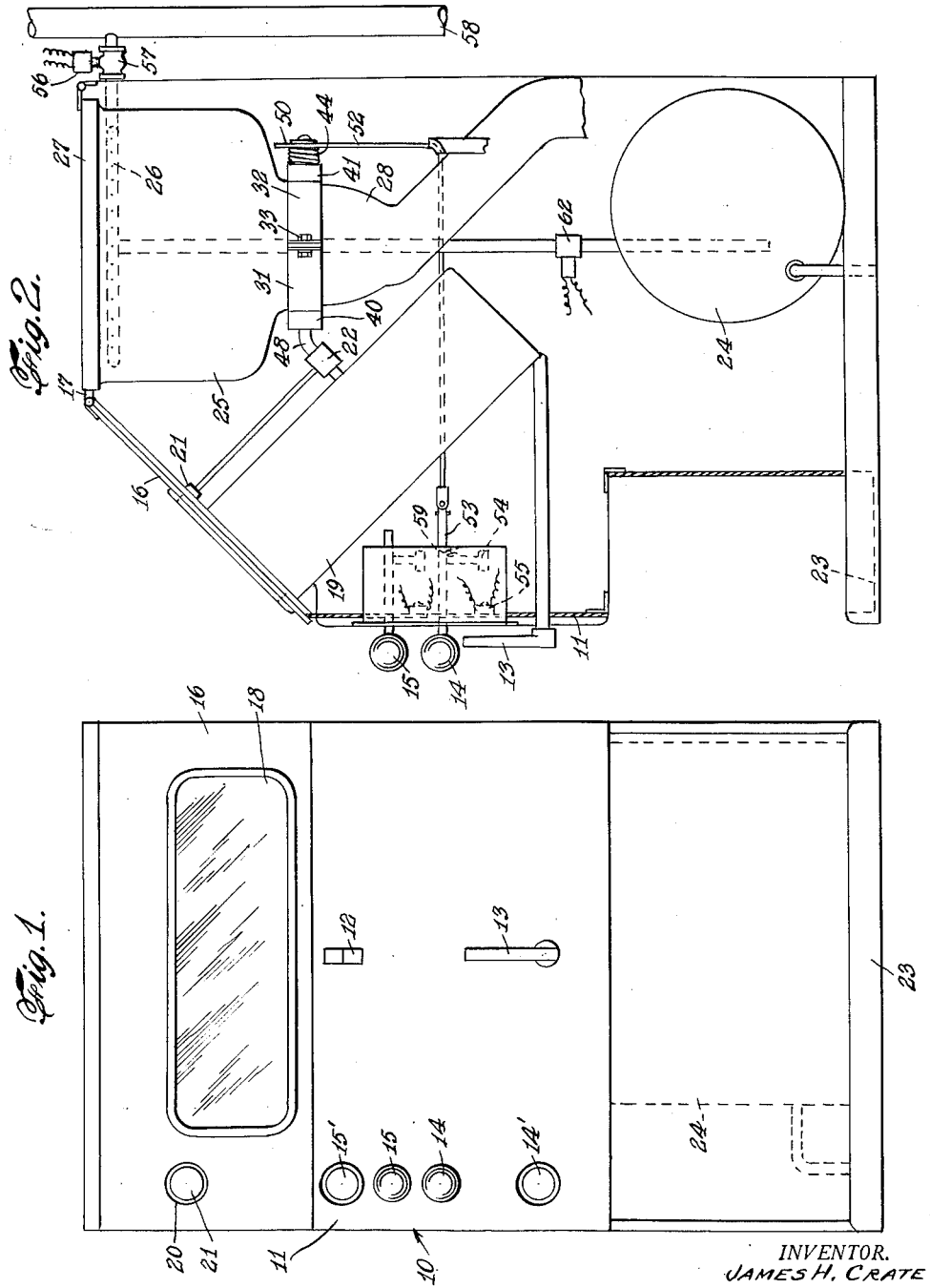
INVENTOR.
JAMES H. CRATE
BY
ATTORNEY.

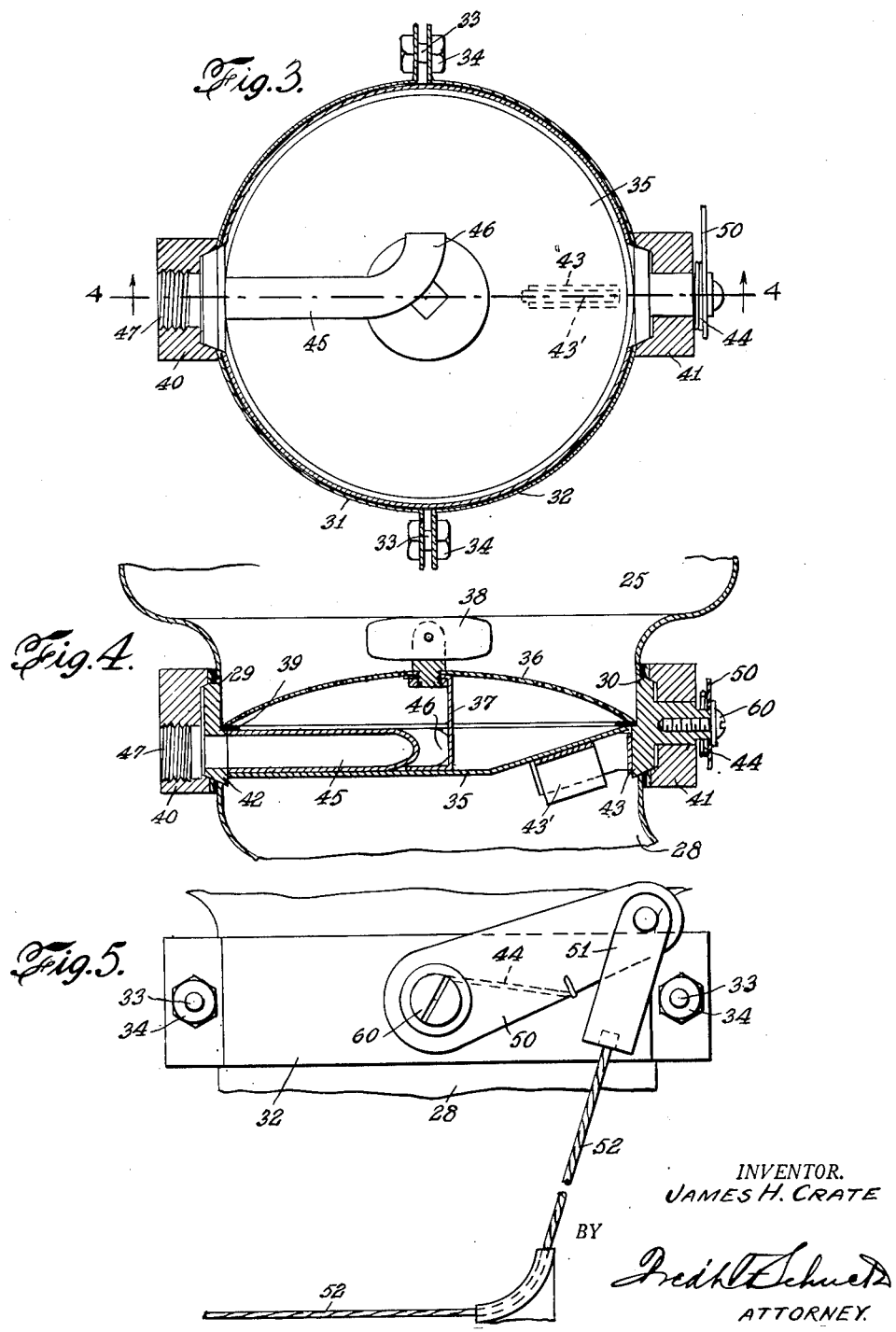

Patented Dec. 23, 1952

2,622,504

UNITED STATES PATENT OFFICE 2,622,504

COFFEE-BREWING APPARATUS

James H. Crate, Detroit, Mich.

Application June 6, 1950, Serial No. 166,502

5 Claims. (Cl. 99—289)

The invention relates to apparatus for brewing coffee, and more especially to apparatus operating under mechanical and electrical controls subject to manual initiation.

In the brewing of coffee, water at a suitable temperature is brought into intimate contact with ground coffee beans in a suitable mixing chamber; and it is an object of the invention to provide means whereby the water filtering through the coffee grounds may be separated therefrom in a novel manner as a coffee infusion and discharged, for example, into a reservoir for the subsequent dispensing of the said infusion.

Another object of the invention is to provide means for thereafter automatically discharging the spent grounds as well as means for then flushing the mixing chamber.

Still another object of the invention is to provide signal means operable to indicate the particular aforesaid conditions prevailing with respect to the mixing chamber.

In carrying out the invention, the chamber in which heated water is distributed over and mixed with ground coffee beans is provided with a rotatable bottom member tiltable through an angle of 90°, said bottom constituting normally a filtering means to separate the coffee infusion from the grounds. When this is completed, the infusion is transferred from the filtering means to a reservoir for subsequent dispensing of the same; and by tilting then the said filtering means, the grounds are discharged, for example, into a suitable sump through the medium of a further supply of water which serves to flush out the entire mixing chamber as well. This flushing operation is preferably to be effected automatically by the action of manually operating control means provided to rotate the filtering means. Suitable electrical signal means afford indications of the position of the said filtering means with respect to its mixing chamber.

The nature of the invention, however, will best be understood when described in connection with the accompanying drawings, in which:

Fig. 1 is a front elevation of the novel coffee brewing apparatus as encased in a suitable cabinet; and Fig. 2 is a side elevation thereof with the one side of the cabinet removed to disclose the various members of the apparatus.

Fig. 3 is a horizontal section, on an enlarged scale, through the filter means of the apparatus and through the mixing chamber as well as the means retaining the one to the other.

Fig. 4 is a fragmentary vertical section thereof taken on the line 4—4, Fig. 3, and looking in the direction of the arrows, together with a portion of the mixing chamber to which it is attached.

Fig. 5 is a fragmentary elevational view of the mounting band for securing the filter means to the mixing chamber and shows also means for tilting the filter means from its normal horizontal location to a vertical location within the mixing chamber.

Referring to the drawings, 10 designates a suitable cabinet or housing for the various members of the brewing apparatus and includes a front panel 11 provided with the switch 12 for an operating electrical power circuit, a spigot 13 for dispensing brewed coffee, a wash water control knob 14 with indicator lamp 14' and a brewing water control knob 15 with indicator lamp 15'. A lid member 16 hinged to the top 17 of the cabinet is provided with a window 18 positioned normally over a reservoir 19 for brewed coffee and with an opening 20 for providing access to a control wheel or the like 21 controlling a valve 22 for discharge of brewed coffee into the reservoir. At the bottom of the cabinet a drip pan 23 is provided, and said bottom supports also a boiler 24 for water to be used in the brewing of the coffee.

Within the cabinet at its upper portion there is located a mixing chamber afforded by the casing 25, the same being provided at its top with a circular spray pipe 26 for providing heated mix water from the boiler 24 for brewing of the coffee, as well as a flushing spray for removal of spent coffee grounds from the mixing chamber as will hereinafter be more fully set forth. The top of the casing 25 is closed by a lid 27 hinged thereto, and at its lower end the casing is provided with a sump connection 28 for the flushing water and spent coffee grounds.

About its bottom, casing 25 is provided with a pair of diametrically disposed openings 29 and 30 for accommodation of the filter means which serves normally to close off the bottom of said casing, but so mounted with respect to the latter that said filter means may be tilted into a vertical position for discharge of spent coffee grounds and the flushing of said filter means and the casing.

The filter means is arranged to be mounted with respect to the casing by a split ring, the two halves 31 and 32 of which are designed to fit about the neck or lower end of the casing and to be clamped thereto by suitable clamping bolts 33 and nuts 34. It is shown more particularly in Figs. 3 and 4, and includes a bottom or collecting pan 35 and a foraminous cover 36 therefor, the latter being tightly secured to the former when the coffee brewing is under way, the ground coffee being supported outside the filter means over the top of its cover 36. The coffee infusion then passes through the openings of said cover 36 to collect within the pan 35 from which it is to be conveyed to the reservoir 19 to be dispensed therefrom by operation of the spigot 13, as is well understood.

To secure the cover 36 to the pan, a bracket 37 is attached to and extends upwardly from the bottom of the pan, being threaded at its upper turned-over end to receive a wing clamping nut or thumbscrew 38 which is designed to pass through the cover. A gasket 39 is to be provided between the cooperating edges of the pan and cover to insure a watertight seal between the filter means and the mixing chamber except for the cover openings.

In order to effect the discharge of the coffee infusion from the collecting pan 35 as well as to permit of tilting the filter means as a whole about a horizontal axis, provision is made to mount the same rotatably in the band halves 31 and 32 which to this end may be provided with the diametrically disposed and bored enlargements 40 and 41. The latter are designed to receive corresponding trunnions 42 and 43, respectively, and have conical bearing surfaces as shown to afford a proper seal. The one trunnion 42 is an integral part of the pan while the other trunnion 43 is coupled to said pan for ready separation therefrom as through bent spring metal coupling elements 43'. The filter means is normally maintained in its horizontal location by means of a torsion spring 44 which is introduced about one trunnion, as the trunnion 43, between the latter and the corresponding enlargement 41. The trunnion at this end also is extended outwardly beyond the said enlargement as a shaft which receives means to rock the same and therewith the filter means as a whole, as will hereinafter be more fully set forth. At the opposite end or enlargement 40 the trunnion does not extend through its said enlargement, and is bored through to receive an outlet pipe 45 mounted on the bottom or deepest portion of the pan, said pipe having a right-angled portion 46 bent in a direction which will cause it to point downwardly when the filter means is rotated through an angle of 90° into a vertical position. This avoids the possibility of wash-out water and spent coffee grounds or sediment entering the pan therethrough.

To receive from said tube the brewed coffee which has collected in the pan of the filter means, the outlet end of the tube is juxtaposed to the inner end of the threaded bore portion 47 of enlargement 40 and the latter receives a pipe 48 for connection to the reservoir 19, control valve 22 being inserted in said connection.

The tilting of the filter means may be effected in any convenient manner, for example, by securing an arm 50 to the shaft extension of trunnion 43 and linking the same through the link 51 and cable 52 and slide bar 53 to the wash control knob 14. Bar 53 carries a switch-actuating member 54 which is adapted to engage the switch 55 at the rear of panel 11; and the said switch is designed to close a circuit to indicator lamp 14' and to a solenoid 56 operating the control valve 57 for delivery to the mixing chamber of wash water from a hot water main 58. A spring 59 acting on bar 53 tends normally to maintain the solenoid de- energized and it will thus be necessary when discharging the mixing chamber and flushing the same to hold the bar, through knob 14, manually in its drawn-out position and during which time the appropriate signal will be displayed by lamp 14'. By the foregoing arrangement, it is possible to clean adequately and rapidly the mixing chamber and filter automatically, that is to say, without actual access thereto. Should it be desirable, however, to have access thereto, as well as to remove entirely to this end the filter means temporarily, this may be effected through raising the lid 27. The filter means as a whole may then be withdrawn by removing the flanged-head screw 60 and uncoupling the trunnion 43 from the pan, which permits said filter means to be tilted upwardly at the uncoupled end sufficiently to allow of trunnion 42 clearing its bearing.

When the filter means is again returned to the position for closing off the casing 25, mechanical contact between member 54 and the switch 55 having been interrupted, said switch will be permitted to close a circuit to a further indicator lamp 15', as is well understood, to indicate that the apparatus is in condition for brewing. This will then be effected by providing the proper charge of fresh ground coffee and the required hot water in the casing 25 over said filter means for another cycle. Water for this purpose is obtained from the boiler 24, the supply being under electrical control, for example, of a solenoid 62 operable from a suitable switch indicated by knob 15 which is to be drawn manually outwardly to energize said solenoid.

I claim:

1. Coffee brewing apparatus, comprising a casing to receive ground coffee and heated water and affording a mixing chamber therefor having a discharge opening at the base for spent coffee grounds and an upper closable opening to supply ground coffee, together with means to deliver water into the mixing chamber; a flattened combined filter and brewed coffee container unit at the base of the casing and affording a valve normally closing the discharge opening, said unit comprising a closed vessel having an upper perforated wall portion to intercept ground coffee and pass the coffee infusion into the container when the unit is in the closed position, together with an outlet tube extending over the bottom of the vessel and open at its inner end for discharge of filtered coffee infusion from said vessel; trunnion means to support the unit rotatably at diametrically opposite points of the casing wall, one of which means is bored coaxially with the outlet tube for discharge of the coffee brew from the container unit; and means to rock said unit about the trunnion means axis to assume a position substantially at right angles to its normal closure location to open the casing for discharge of spent coffee grounds therethrough.

2. Coffee brewing apparatus according to claim 1, wherein additional means are provided to supply water to the mixing chamber, said supply means being controlled by the rotation of the filter and brewed coffee container unit only when the latter is rotated to a substantially vertical position.

3. A rotatable filter means for the brewing of coffee according to claim 1, wherein the filter and brewed coffee container unit comprises a bottom collecting pan of circular conformation and a foraminous cover member, and the trunnion means are secured to the pan thereof at diametrically opposite points.

4. A rotatable filter means for the brewing of coffee according to claim 3, wherein the filter and brewed coffee container unit is divided substantially along a plane including the axis of rotation of the trunnion means and one of said trunnion means is removably secured to said pan.

5. Coffee brewing apparatus according to claim 1, wherein the axis of opening of the inner end of the coffee infusion outlet tube located along the bottom of the closed vessel is at right angles to the axis of rotation of the filter and brewed coffee container unit such that when the latter is rotated to a substantially vertical position the opening faces substantially vertically downward.

JAMES H. CRATE.

REFERENCES CITED

The following references are of record in the file of this patent:

UNITED STATES PATENTS

| Number | Name | Date |
| --- | --- | --- |
| 1,007,200 | Hessdorfer | Oct. 31, 1911 |
| 1,462,322 | Casoletti | July 17, 1923 |
| 1,665,728 | Canright | Apr. 10, 1928 |
| 1,804,795 | Lee | May 12, 1931 |
| 1,980,931 | Rothermel | Nov. 13, 1934 |
| 2,315,777 | Denton | Apr. 6, 1943 |
| 2,398,314 | Laereman | Apr. 9, 1946 |
| 2,488,817 | Kaminky | Nov. 22, 1949 |